United States Patent
Takeuchi

[11] Patent Number: 5,978,614
[45] Date of Patent: Nov. 2, 1999

[54] IMAGE SCANNING APPARATUS WITH LIGHT SOURCE CONDITION TESTING

[75] Inventor: Shigeki Takeuchi, Ohtsu, Japan

[73] Assignee: Murata Kikai Kabushiki Kaisha, Kyoto, Japan

[21] Appl. No.: 09/046,984

[22] Filed: Mar. 24, 1998

[30] Foreign Application Priority Data

Mar. 27, 1997 [JP] Japan .................................... 9-075482

[51] Int. Cl.⁶ .......................... G03G 15/04; G03G 21/00
[52] U.S. Cl. .............................. 399/32; 399/51; 399/203; 399/220
[58] Field of Search .................................. 399/32, 47, 51, 399/203, 220

[56] References Cited

U.S. PATENT DOCUMENTS

| | | | |
|---|---|---|---|
| 4,215,930 | 8/1980 | Miyakawa et al. | 399/47 |
| 4,657,377 | 4/1987 | Takahashi | 399/47 |
| 4,737,819 | 4/1988 | Taniguchi | 399/32 |
| 5,214,520 | 5/1993 | Miyazawa | 358/461 |
| 5,282,060 | 1/1994 | Kizu et al. | 358/461 |
| 5,339,139 | 8/1994 | Fullerton et al. | 399/203 |
| 5,365,349 | 11/1994 | Knodt et al. | 399/32 X |
| 5,732,308 | 3/1998 | Miura | 399/32 |

FOREIGN PATENT DOCUMENTS

| | | |
|---|---|---|
| 59-229967 | 12/1984 | Japan . |
| 1246967 | 10/1989 | Japan . |
| 2304932 | 3/1997 | United Kingdom . |

*Primary Examiner*—Fred L Braun
*Attorney, Agent, or Firm*—Loeb & Loeb LLP

[57] ABSTRACT

An image scanner arrangement having a scanner, a document feeder scanning portion and a flat scanning bed. A single white plate is provided between the document feeder scanning portion and flat bed. Before scanning, the scanner scans the white plate to provide image data for testing. If this image data contains white pixels not less than 90%, a controller determines that a lamp of a light source of the scanner illuminates appropriately. After confirming that the light source is in a good condition, the scanning starts. The single white plate is utilized regardless of scanning being performed with the document feeder scanning portion or the flat scanning bed.

16 Claims, 6 Drawing Sheets

IMAGE SCANNING APPARATUS WITH LIGHT SOURCE CONDITION TESTING

BACKGROUND OF THE INVENTION

1. Technical Field

The present invention relates to an image scanning apparatus incorporated in, for example, a copier, a facsimile apparatus or a copier-facsimile system, and more particularly to an image scanning apparatus which can effectively determine whether a lamp of a light source of the image scanning apparatus is functioning appropriately.

2. Background Art

A certain type of copier-facsimile system includes not only a flat bed scanner (FBS) for scanning one sheet of an original document at a time by placing the original document on a scanning table but also an automatic document feeder (ADF) for successively scanning a plurality of documents by stacking the documents on a paper feed tray.

When the document is scanned by the flat bed scanner, the document is stationarily placed on the scanning table. With the document being fixed by a cover placed over the document, a light source and a plurality of mirrors of a scanning unit are moved under the scanning table upon actuation of an associated motor. The scanning unit moves from a scanning start position under a front end of the scanning table to a scanning end position under a rear end of the scanning table. A light is being radiated to the document from the light source through the scanning table while the scanning unit is moving, and a reflected light is scanned by an image pick-up element such as CCD via the mirrors and lens. CCD outputs black and white binary image data according to the scanned image.

On the other hand, the automatic document feeder successively feeds the documents over the scanner automatically from the paper feed tray. The scanner is not moved during scanning. An image on each document is scanned by CCD when it passes over a translucent plate. A mirror is positioned just below the translucent plate so that CCD can obtain the image reflected by this mirror.

Before scanning the document by the flat bed scanner, a lamp checking is performed to the light source of the scanning unit every time a user presses a start key. The lamp checking is scanning of a white plate. As illustrated in FIG. 7 of the accompanying drawings, which schematically indicates a scanning bed 31 and a white plate 43a' as viewed from the top, the white plate 43a' is located at a position P5 next to the flat bed 31 in a sub-scanning direction or outside a scanning start position P3 of the scanner. The lamp testing is necessary because brightness or luminance of the light source eventually drops below an appropriate value due to aging or the like. Scanning of the white plate is self diagnosis or examination conducted before scanning. Data relating to one line of the document scanned is converted to binary data, and if there are white pixels more than a predetermined value (e.g., 90%), it is determined that the lamp of the light source emits an appropriate light an good condition. Then, the document scanning is initiated. When a plurality of documents are scanned using the automatic document feeder, another white plate placed above the translucent plate (not shown in FIG. 7) is scanned to examine the lamp of the light source. Therefore, the image scanning apparatus which includes both the flat bed scanner and the automatic document feeder has two white plates for lamp testing.

Since one of the white plates 43a' is located beyond the scanning start position P3 of the scanner or outside a scanning table area but inside the image scanning apparatus in the subscanning direction of the scanner (or direction in which a carriage supporting the light source moves), the length of the scanning apparatus in the sub-scanning direction is elongated by at least the length of the white plate 43a'. Thus, it is difficult to reduce the size of the scanning apparatus. In addition, since two white plates are required, the number of components is large and construction of the apparatus is complicated. Moreover, the carriage first has to move to the lamp check position P5, which is next to the scanning start position P3 in a direction opposite to the scanning direction of the scanner (the scanner moves from the scanning start position P3 to a scanning end position P4 or from the FBS front end to the FBS rear end in FIG. 7) every time a sheet of document is scanned by the flat bed scanner. Accordingly, a user must wait for a while after pressing a start key until the scanning really starts.

SUMMARY OF THE INVENTION

The present invention intends to solve the above described problems of the conventional image scanning apparatus.

An object of the present invention is to propose an image scanning apparatus which is provided with both a flat bed scanner and an automatic document feeder but has only one white plate for lamp checking so that the apparatus can be designed to be compact in size and simple in structure.

According to one aspect of the present invention, there is provided an image scanning apparatus of a type having a scanner, an automatic document feeder for successively feeding a plurality of documents over the scanner such that the scanner in a stationary condition can sequentially scan the documents and a flat bed for placing a single document at a time to allow the scanner to scan the single document at a time while the scanner is moving from a scanning start position to a scanning end position, characterized in that a single white plate is provided at a particular position (i.e., test position) inside a main body of the image scanning apparatus between the automatic document feeder and flat bed, and a determination means or lamp testing means is provided to determine using the white plate whether a lamp of a light source of the scanner illuminates appropriately. The lamp testing to the light source of the image scanning apparatus is always carried out at the single test position (reference position) regardless of scanning being carried out using the FBS or the ADF. The lamp test position is between the scanning start position for the FBS and the scanning position for the ADF so that the image scanning apparatus can be designed compact and have a simple structure. Preferably, the white plate is located at a position relatively close to the ADF rather than the flat bed.

The image scanning apparatus may include a storage means for storing image data of the original document as obtained by scanning. The image data stored in the storage means may be labeled "effective" if the determination means determines that the light source is emitting a suitable light. Printing of the image as scanned may only be allowed if the image data is labeled "effective" or "valid". Otherwise, the image data will be erased from the storage means. Therefore, the storage means is not occupied by inappropriate image data.

The lamp checking may be performed after a document is scanned by the flat bed scanner. Conventionally, the lamp checking is performed prior to scanning. If the lamp checking is performed after scanning, it is possible to reduce the time required between a user's pressing a start button and completion of scanning.

Additional objects, aspects and advantages of the present invention will become apparent to those skilled in the art to which the invention relates from the following detailed description of preferred embodiments and the appended claims as read in conjunction with the accompanying drawings.

BRIEF DESCRIPTION OF THE ACCOMPANYING DRAWINGS

DETAILED DESCRIPTION OF THE PREFERRED EMBODIMENTS

Now, a preferred embodiment of the present invention will be described with reference to the accompanying drawings. The following description deals with an example of when the present invention is applied to a copier-facsimile system.

Figure 1:
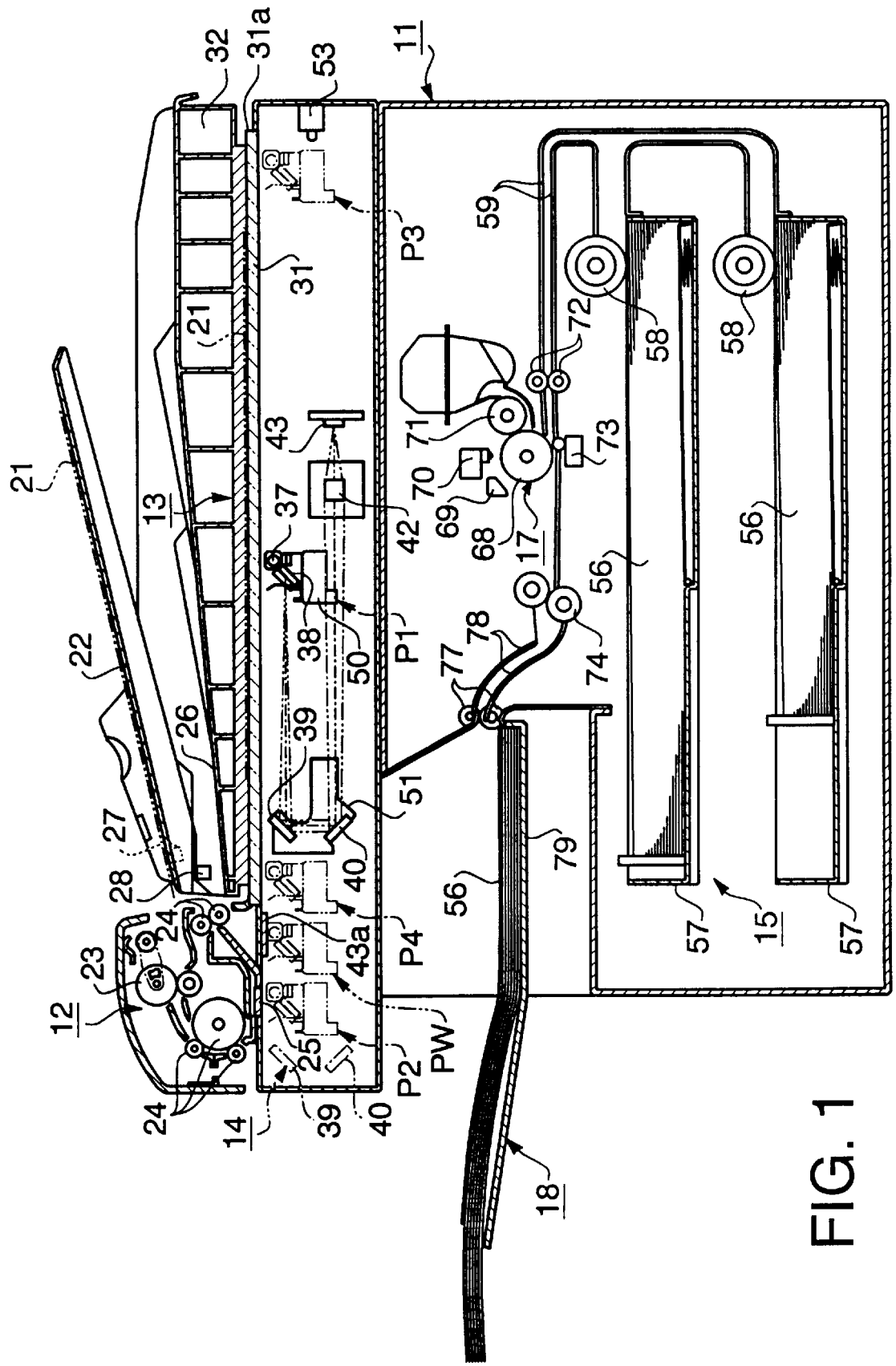
FIG. 1 illustrates a sectional view of a copier-facsimile system according to the present invention.

Referring to FIG. 1, illustrated is a sectional view of the copier-facsimile system 11. This system 11 includes a document feeder unit 12, a scanning table unit 13, a scanning unit 14, a bond paper (cut paper) feeder 15, a recording unit 17 and a bond paper discharge unit 18.

The document feeder unit 12 includes a document tray 22 for placing one or more documents 21, a separation roller 23 for separating and feeding the documents 21 sheet by sheet, a plurality of feed rollers 24 to transport the document 21 along a predetermined path, a translucent plate 25 over which the document 21 is transported, and a document discharge tray 26 for receiving the discharged documents 21.

A document sensor 27 for detecting presence of the original document 21 is buried in the document feed tray 22 so that it faces the documents 21 when the documents are loaded into the tray 22. The document sensor 27 outputs a detection signal to CPU 82 if there is one or more original documents 21 on the tray 22. A second document sensor or discharged document sensor 28 for detecting presence of the discharged document 21 is located to face the discharged document tray 26 so that it outputs a detection signal if there is one or more documents 21 in the tray 26.

The document table unit 13 includes a transparent plate 31 for placing a single document 21 thereon and a cover 32 pivotably provided over the transparent plate 31 for press-holding the document 21 on the plate 31 when it is closed. FIG. 1 shows the cover 32 In the closed condition.

The document feeding tray 22 and discharged document receiving tray 26 of the document feeder unit 12 are both mounted on the cover 32 of the document table unit 13. Accordingly, the document feeding and receiving trays 22 and 26 move together with the cover 32.

The scanner unit 14 includes a light source 37 for radiating a light of beam to the document 21 passing over the translucent plate 25 or the document 21 stationarily placed on the document table 31, first to third mirrors 38 to 40 for changing a path of the light reflected by the document 21, and a translation mechanism 41 for moving the light source 37 and first to third mirrors 38 to 40. The scanning unit 14 further includes a light condensing lens 42 for condensing the light coming from the third mirror 40 and an image scanning or pick-up element (CCD) 43 for reading the image or picture on the document 21 based on the light incoming through the condensing lens 42.

Figure 2:
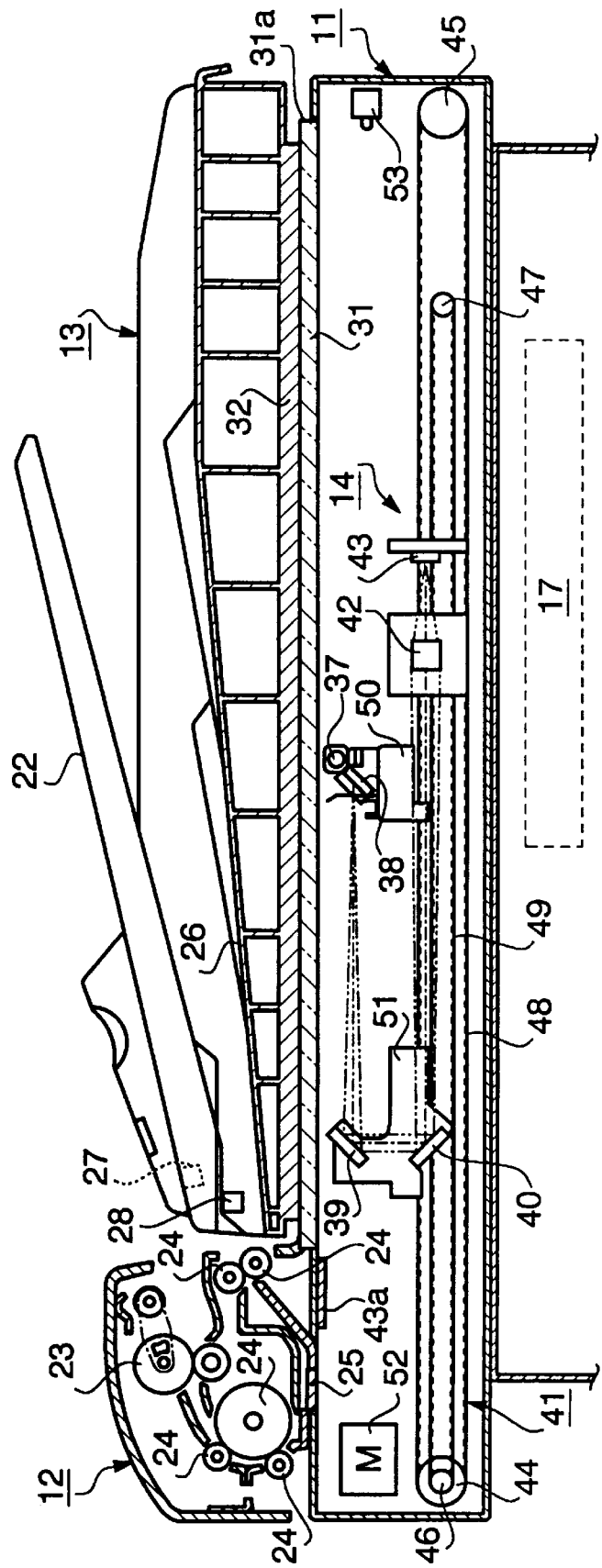
FIG. 2 is an enlarged view of major components of the system shown in FIG. 1.

As best seen in FIG. 2, a white plate 43a is fixedly attached to a back surface of an uppermost plate of a main body of the copier-facsimile system 11 between the ADF and the FBS for checking whether the lamp 37a of the light source 37 is emitting an appropriate light.

The translation mechanism 41 includes a pair of right and left large pulleys 44 and 45, a pair of right and left small pulleys 46 and 47, a first belt 48 engaged over the large pulleys 44 and 45, and a second belt 49 engaged over the small pulleys 46 and 47. The translation mechanism 49 also includes a first carriage 50 mounted on the first belt 48, a second carriage 51 mounted on the second belt 49 and a stepping motor 52.

In the illustrated embodiment, the large pulley 44/45 has a diameter twice as large as the small pulley 46/47. The left large and small pulleys 44 and 46 are coaxially united so that they rotate together. These pulleys are driven by the stepping motor 52. The first carriage 50 supports the light source 37 and first mirror 38 thereon and the second carriage 51 supports the second and third mirrors 39 and 40 thereon.

As the large pulleys 44 and 45 and small pulleys 46 and 47 are rotated by the stepping motor 52, the first and second belts 48 and 49 are moved and in turn the first and second carriages 50 and 51 are moved. In this situation, the first carriage 50 is moved at a speed twice as fast as the second carriage 51. With this speed difference, as illustrated in FIG. 1, the carriages 50 and 51 are selectively translated to an intermediate stand-by position P1, a first scanning position P2 under the translucent plate 25, a second scanning start position P3 under the right end 31a (reference end) of the document plate 31, or a white plate scanning position PW under the white plate 43a. P4 indicates a scanning end position at which the carriages 50 and 51 are stopped when the scanning starts from the second scanning position P3.

The document feeding unit 12 and scanning unit 14 constitute a scanner for automatically and successively scanning a plurality of original documents (ADF: Automatic Document Feeder). The image or picture on the document 21 passing over the translucent plate 25 is scanned while the carriages 50 and 51 are staying at the first scanning position P2. The carriages do not move during the scanning whereas the original documents move. On the other hand, the document table 13 and scanning unit 14 constitute a flat bed scanner (FBS: Flat Bed Scanner). The image on the original document 21 placed on the document table 31 is scanned while the carriages 50 and 51 are being moved to the scanning end point P4 from the second scanning start position P3. The original document does not move whereas the scanning unit 14 moves during the scanning.

Figure 3:
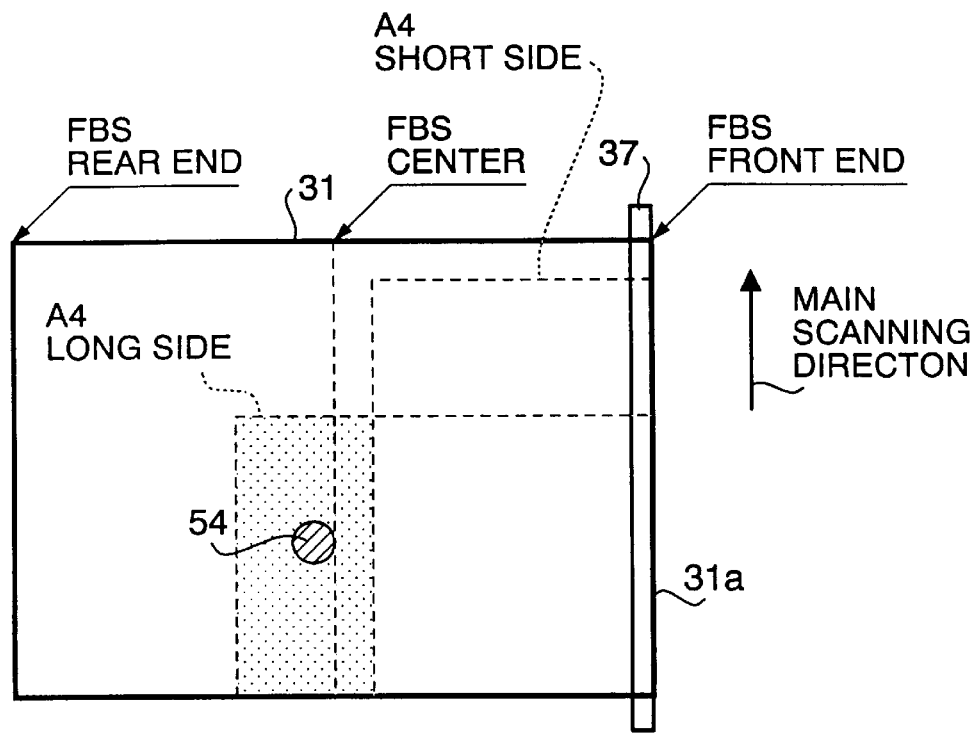
FIG. 3 is a plan view of a flat bed (scanning table) with a document length sensor.

A carriage position sensor 53 is provided below the right end 31a of the document table 31 such that it generates a detection signal when the carriages 50 and 51 are in the second scanning start position P3. As illustrated in FIG. 3, a document length sensor 54 is provided at a position spaced from the right end 31a of the document table 31 (or near the center of the flat bed 31) as viewed from the top. The document length sensor 54 faces the document table 31 such that it detects (or determines) the length of the original document 21 placed on the flat bed 31. It should be noted that the scanning unit 14 including the light source 37 also serves as a document width sensor. After the first carriage 50 is moved to the second scanning start position P3, the width of the document 21 is determined by the scanning unit 14 while the scanning unit 14 is performing the scanning of the document 21 in a main scanning direction.

Referring back to FIG. 1, the bond paper feeding unit 15 includes a plurality of paper feed cassettes 57 for stacking recording sheets (bond paper) 56 of predetermined sizes, paper feed rollers 58 for feeding the bond papers 56 sheet by sheet toward the recording unit 17 from the associated cassettes 57, and guide plates 59 for guiding movement of the bond papers 56. In the particular embodiment, there are two paper cassettes 57 and different sizes of sheets 56 are stacked in these cassettes.

The recording unit 17 includes a photosensitive drum 68, an electric charger 69 for uniformly charging a surface of the photosensitive drum 68 to a predetermined voltage, an exposing device 70 for forming an electrostatic latent image of the original on the photosensitive drum 68, and a developing device 71 for feeding a toner over the electrostatic latent image on the photosensitive drum 68 to develop a toner image. The recording unit 17 further includes a pair of feed rollers 72 to feed the bond paper 56 to the photosensitive drum 68, a transfer unit 73 for transferring the toner Image to the bond paper 56 from the photosensitive drum 68, and a fixer 74 for heating and fixing the toner image on the bond paper 56.

The discharged bond paper tray unit 18 includes a pair of paper discharge rollers 77 for discharging the bond paper 56 after recording (image fixing), a discharged paper tray 79 for receiving the discharged bond papers 56 and guide plates 78 for guiding movement of the bond paper 56 to the discharge tray 79.

Figure 4:
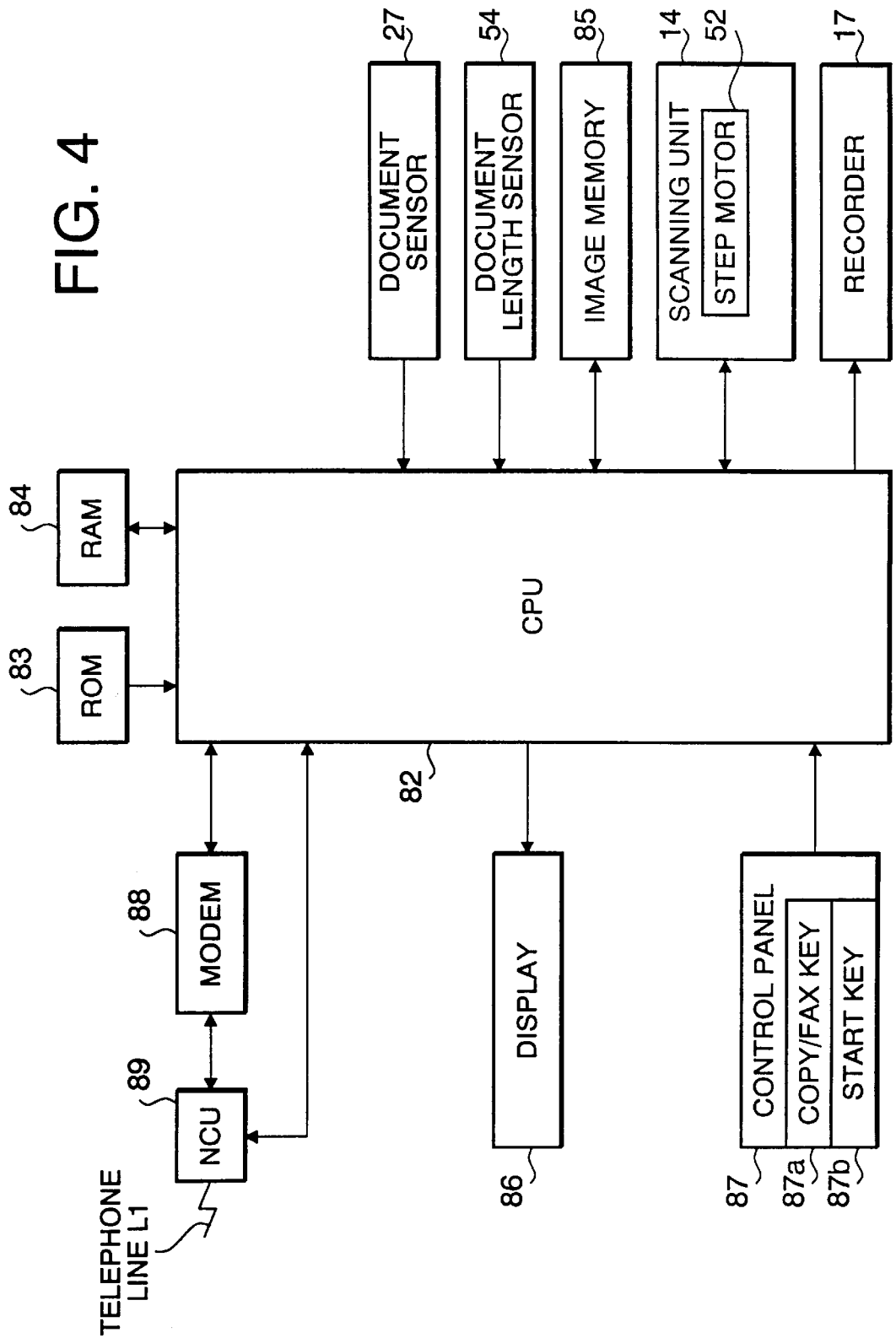
FIG. 4 illustrates a block diagram of the copier-facsimile system shown in FIG. 1.

A circuitry configuration of the copier-facsimile system 11 having the above described structure will be described with reference to FIG. 4. CPU 82 controls operations of the components of the copier-facsimile system 11. ROM 83 stores various control programs necessary to CPU 82. RAM 84 temporarily stores data and the like obtained upon execution of the control programs. CPU 82, ROM 83 and RAM 84 constitute a determination means.

The document sensor 27 and document length sensor 54 output their detection signals to CPU 82 respectively. The scanning unit 14 scans the image on the original document 21 over the translucent plate 25 or document table 31 and outputs black and white binary image data to CPU 82. An image memory 85 temporarily stores image data sent from a remote communication device or that scanned by the scanning unit 14. The recording unit 17 prints the image data sent from the remote communication device or the image data scanned by the scanner 14 on the bond paper 56.

A display unit 86 includes a liquid crystal panel and/or LEDs to indicate information about the operation of this system 11 such as "COPY MODE", "FAX MODE", "STAND-BY CONDITION" and "CHANGE LAMP". A control panel 87 includes various function keys such as a copy/fax key 87a and a start key 87b. The copy/fax key 87a is used to select a copy mode or fax mode. A user presses the start key 87b to start the copying or facsimile communication.

A modem 88 is also connected to CPU 82 such that it modulates and demodulates data to be sent to and received from the remote communication device. NCU 89 controls connection/disconnection of a telephone line L1 with/from the system 11. NCU 89 also detects transmission and reception of a dial pulse corresponding to a facsimile number of the remote communication device.

Next, operations of the copier-facsimile system 11 of the invention executed when it scans the original document 21 by the flat bed scanner (FBS) to make a copy of the original document will be described with reference to a flowchart shown in FIG. 5. The series of operations shown in this flowchart proceed under the control of CPU 82 based on the control program stored in ROM 83.

After the document 21 is placed on the document table 31 by a user, it is determined whether the start key 87a is pressed (S1).

If the user presses the start key 87a, the first carriage 50 is moved to the second scanning start point P3 (S2).

At S3, the original 21 is scanned while the first carriage 50 is moving to the scanning end position P4 from the scanning start position P3. The image data obtained upon scanning is stored in the image memory 85.

Subsequent to this step, the first carriage 50 is translated to the white plate scanning position PW so that the first carriage 50 faces the white plate 43a (S4).

Then, the white plate 43a is scanned by CCD 43 (S5).

One line of data among those scanned at S5 is converted to binary data and it is determined whether this binary data contains white pixels equal to or more than a predetermined value (90% in this embodiment) (S6). Specifically, if 90% or more of the binary data is white pixel, then it is determined that the light source appropriately illuminates. In other words, the white pixels occupy 90% or more of the image data, the lamp 87a of the light source 37 is determined to be in a good condition. Then, the program proceeds to S7 such that the image data of the original 21 stored in the image memory 85 at S3 is printed on the bond paper 56. On the other hand, if the white pixels are less than 90%, it is determined that the lamp 37a deteriorates considerably or dies from natural or other causes. In this case, it is determined that the image data stored in the image memory 85 at S3 includes a certain error, so that it is erased from the image memory 85 (S8).

After S8, the display 86 indicates a message or sign to urge lamp exchange (S9). Noticing this message or sign, the user replaces the lamp 37a of the light source 37.

After S7 or S9, the first carriage 50 is moved to the standby position P1 to terminate this process (S10). The copier-facsimile system 11 is now ready for scanning of a next document 21.

Figure 6:
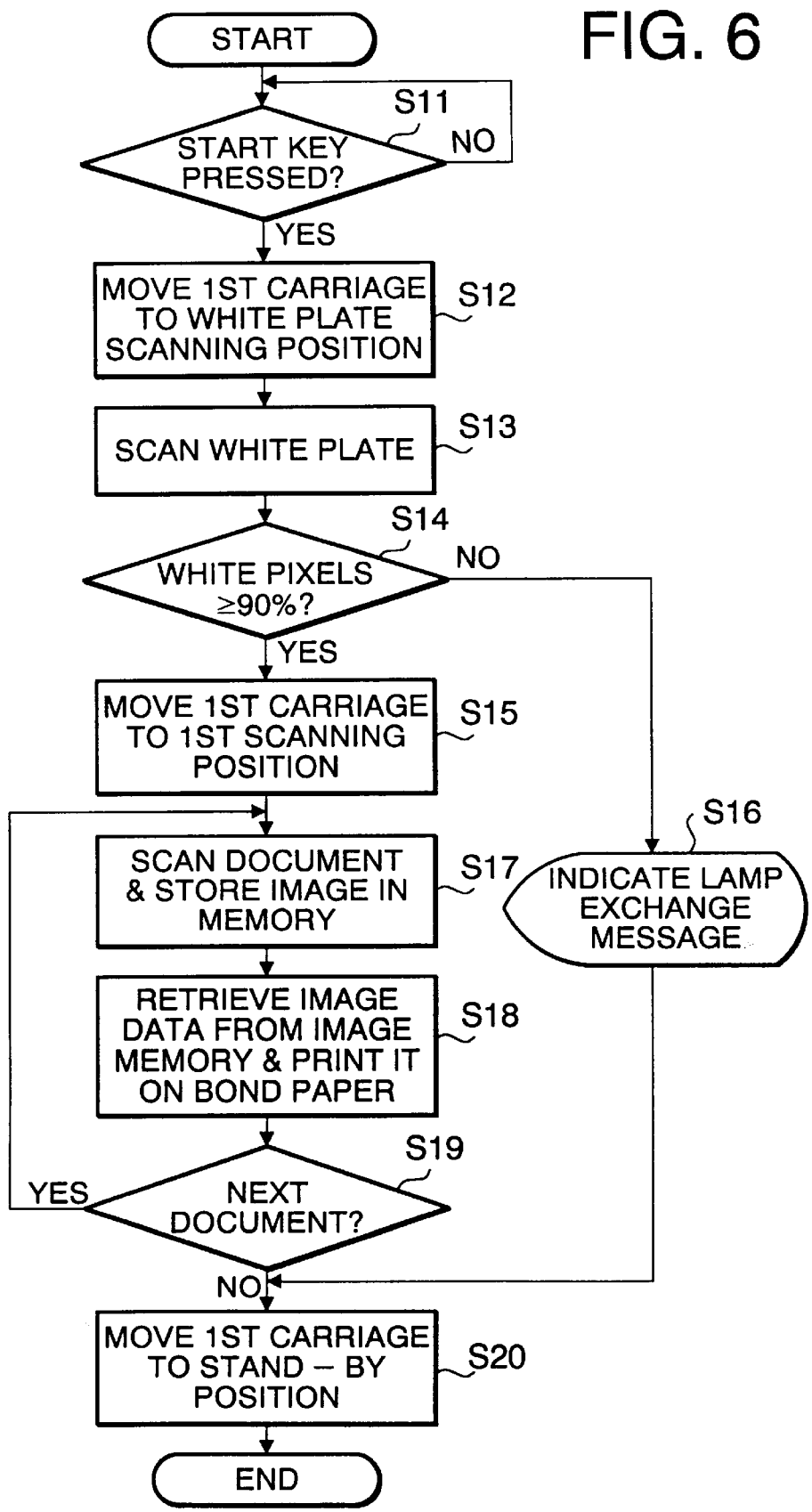
FIG. 6 is a flowchart showing operations executed by the system when documents are scanned using an automatic document feeder.

Next, the operations of the copier-facsimile system 11 when a plurality of documents 21 are successively fed from the ADF will be described with reference to the flowchart shown in FIG. 6. The series of operations shown in this flowchart also proceed under the control of CPU 82 based on the control program stored in ROM 83.

The user first places the documents 21 on the document tray 22. Then, pressing the start key 87a is awaited (S11).

If the user presses the start key 87a, the first carriage 50 is moved to the white plate scanning position PW under the white plate 43a (S12).

Figure 5:
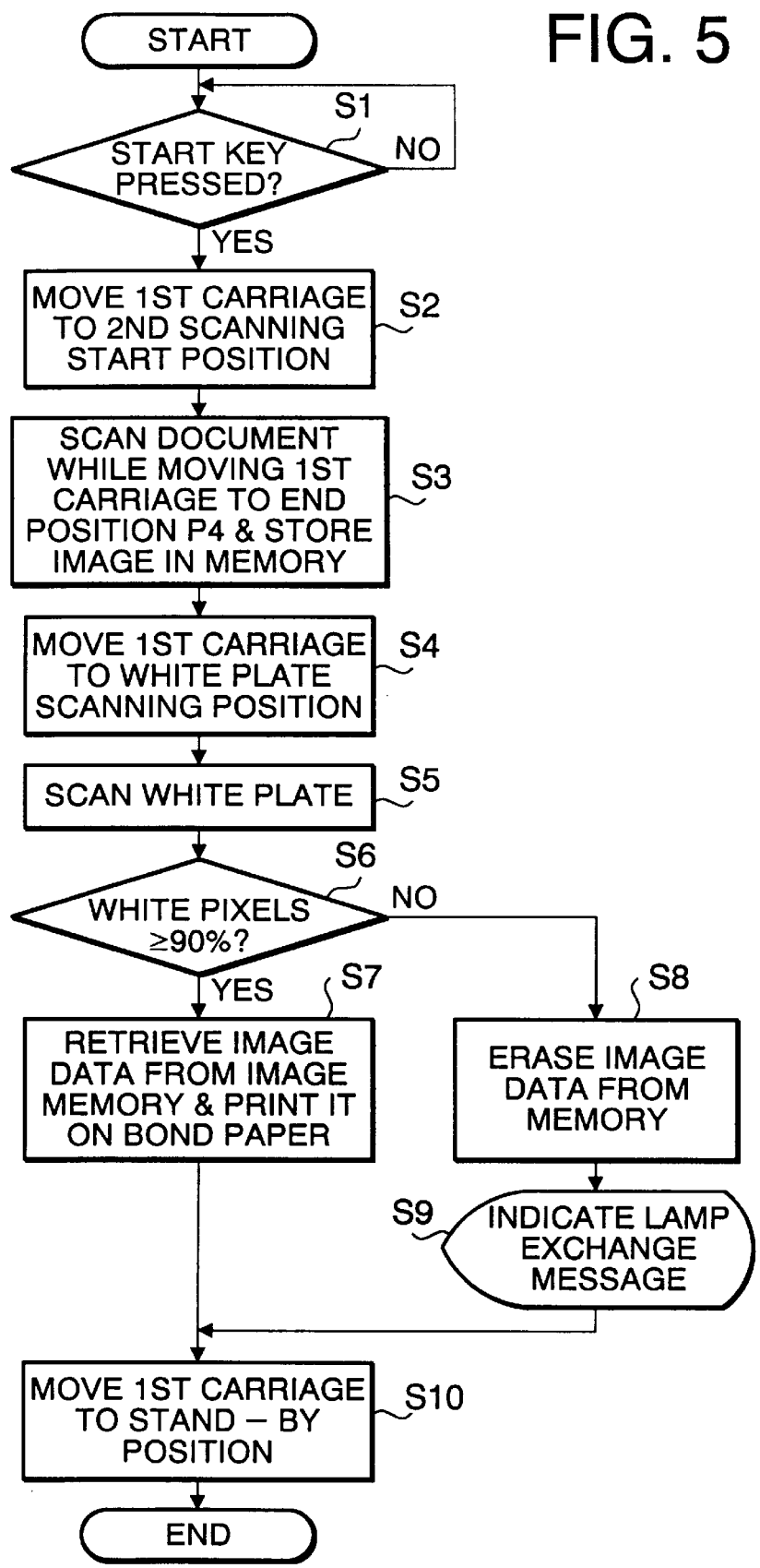
FIG. 5 is a flowchart showing operations executed by the system when a document is scanned using the flat bed.

At S13, the white plate 43a is scanned by CCD 43, like S5 of FIG. 5.

Then, one line of data among those scanned at S13 is converted to binary data and it is determined whether it contains 90% or more white pixels (S14). If there are 90% or more white pixels, it is determined that the lamp 37a of the light source 37 functions appropriately, and the program advances to S15 thereby moving the first carriage 50 to the first scanning position P2. On the other hand, if the white pixels are less than 90%, it is determined that the lamp 37a has deteriorated or gone out. Then, the display 87 indicates a particular message or sign to urge lamp exchange (S16). After S16, the first carriage 50 is moved to the stand-by position P1 (S20).

After the first carriage 50 is moved to the first scanning position P2 at S15, the first document 21 is scanned as it is supplied over the translucent plate 25 from the stack of documents 21 on the paper tray 22 of the ADF (S17). Image data obtained upon scanning of the document 21 is stored in the image memory 85.

The image data in the image memory 85 is then printed on the bond paper 56 (S18).

At the next step, it is determined whether there is a next document 21 on the paper tray 22 (S19). Specifically, it is determined whether there is at least one more document 21 on the paper tray 22 based on a detection signal from the document sensor 27. If the answer is YES at S19, the program returns to S17. On the other hand, if there is no document 21 on the paper tray 22, the program goes to S20 so that the first carriage 50 is returned to the stand-by position P1 to terminate this process.

Figure 7:
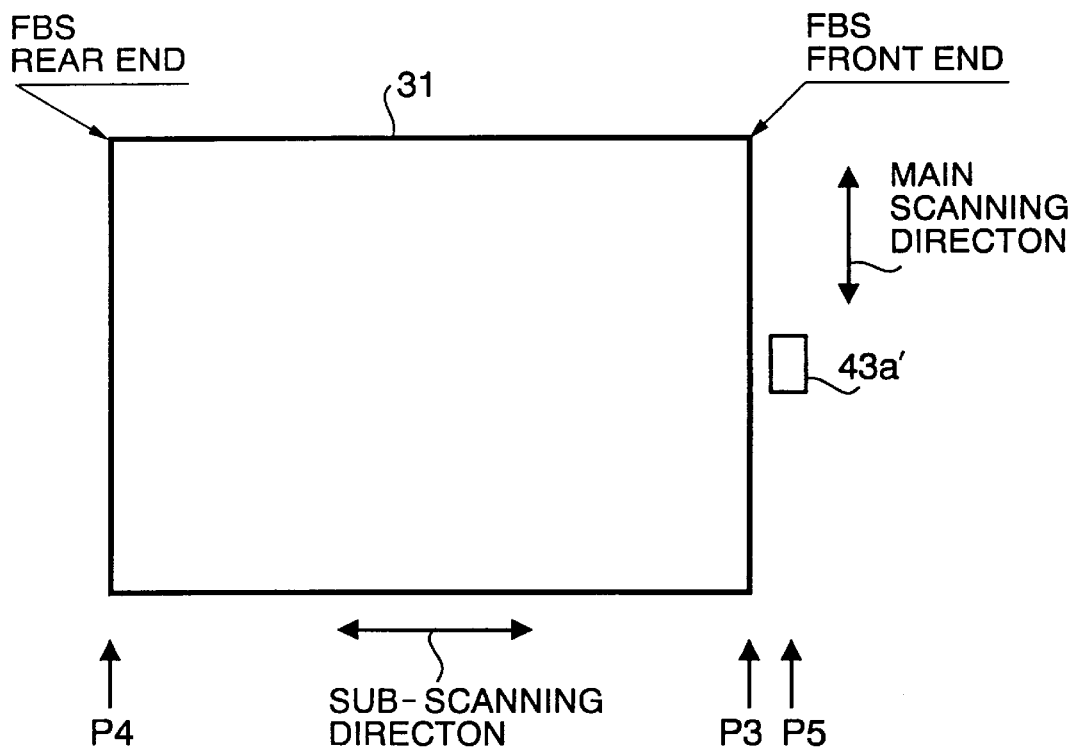
FIG. 7 illustrates a plan view of a flat bed (scanning table) with a conventional white plate used for lamp testing.

As understood from the above description, the illustrated embodiment has the following advantages:

(1) Since the white plate 43a is located between the ADF and the FBS (as best illustrated in FIG. 2, the white plate 43a is positioned between the translucent plate 25 and the left end of the scanning bed 31a), CCD 43 can use this single white plate 43a in the lamp testing when the document scanning is carried out using the ADF and when using the FBS. Conventionally, there are two white plates, and one is placed above the translucent plate and utilized for lamp testing when the document scanning is performed using the ADF and the other is placed next to the right end (front end) of the flat bed and utilized when the document scanning is performed using the FBS. The latter one is located outside the FBS as viewed from the top or outside the scanning start position P3 as illustrated in FIG. 7. The present invention eliminates the white plate outside the scanning bed 31. In the conventional arrangement, when the carriages 50 and 51 are moved to the white plate scanning position P5 (FIG. 7), they exist outside the flat bed 31 since the white plate scanning position P5 is outside the scanning start position P3. In the conventional arrangement, therefore, the main body of the copier-facsimile system is elongated in the sub-scanning direction (to the right in the illustration). In the present invention, on the other hand, there is no white plate outside the scanning bed or second scanning start position P3 so that the main body of the system 11 is reduced in size in the sub-scanning direction as compared with the conventional arrangement. In other words, the carriages 50 and 51 are not moved beyond the position P3 in the invention. As a result, the copier-facsimile system 11 can be designed to be compact.

From another point of view, it can be said that there are two white plates in the conventional arrangement but the present invention combines these white plates to a single white plate.

(2) There is only one white plate 43a provided in the system 11. The single white plate 43a is used in the lamp testing both when the image scanning is conducted using the ADF and when the image scanning is conducted using the FBS. If the document 21 is scanned by the FBS, the scanner moves from the second scanning start position P3 to the end position P4. After that, the white plate 43a is scanned at the lamp test position PW. Thus, the scanning of the document 21 is conducted prior to the lamp testing. This reduces the time required between a user's pressing the start key 87a and the end of the scanning operation.

(3) If it is determined by the lamp testing that the lamp 37a of the light source 37 is abnormal, the image data is not printed on the recording sheet 56. Therefore, the recording sheet will not be wasted.

(4) Even if the original 21 is scanned by the FBS and its image data is stored in the image memory 85, the content of the image memory 85 will be erased if the lamp checking reveals that the lamp 37a of the light source 37 is in a bad condition. Therefore, invalid image data does not occupy the image memory 85. In other words, effective use of the image memory 85 is ensured.

(5) If the lamp 37a of the light source 37 does not function appropriately, the display 86 indicates such a fact. Thus, the user can exchange the lamp 37a promptly.

The present invention is not limited to the above described embodiment, and various modifications and changes may be made without departing from the spirit and scope of the invention.

For example, the white plate 43a may be located above the translucent plate 25 of the ADF, and the lamp testing may be carried out before the original 21 passes over the translucent plate 25 (i.e., when the original 21 does not exist above the translucent plate 25). In this modification, the first carriage 50 is adapted to move below the translucent plate 25 every time the scanning using the FBS is completed.

Instead of or in addition to the display 86, a buzzer or the like may be provided to urge the lamp exchange by making a sound.

What is claimed is:

1. An image scanning apparatus comprising:
    a scanner having a light source which illuminates for scanning;
    a document feeder scanning portion for successively feeding a plurality of documents over the scanner, the scanner being in a stationary condition while it is scanning the plurality of documents fed from the document feeder scanning portion;
    a flat bed scanning portion located spacedly next to the document feeder scanning portion for placing a single document thereon at a time, the scanner being adapted to move under the flat bed scanning portion while it is scanning the single document placed on the flat bed scanning portion;
    a test element located between the document feeder scanning portion and flat bed scanning portion; and
    determination means for determining whether the light source of the scanner illuminates appropriately using the test element both when a document is scanned by combination of the scanner and document feeder scanning portion and when scanned by combination of the scanner and flat bed scanning portion.

2. The image scanning apparatus of claim 1 further including storage means for storing image data of the document as obtained by scanning, and wherein the image data stored in the storage means is labeled "effective" if the determination means determines that the light source illuminates appropriately.

3. The image scanning apparatus of claim 2, wherein retrieving the image data from the storage means and printing the image data is only allowed if the image data is labeled "effective".

4. The image scanning apparatus of claim 2, wherein the storage means is an image memory.

5. The image scanning apparatus of claim 2, wherein the test element is located at a position above the scanner which scans the plurality of documents fed from the document feeder scanning portion.

6. The image scanning apparatus of claim 1, wherein the determination means makes determination after scanning if the document placed on the flat bed scanning portion is scanned by the scanner.

7. The image scanning apparatus of claim 1, wherein the test element is a white plate.

8. The image scanning apparatus of claim 7, wherein the white plate is substantially coplanar to the flat bed scanning portion.

9. The image scanning apparatus of claim 7, wherein the determination means causes the scanner to scan the white plate to obtain image data of the white plate, converts the image data of the white plate to black and white binary data and determines that the light source of the scanner illuminates appropriately if the black and white binary data contains white pixels not less than a predetermined value.

10. The image scanning apparatus of claim 9, wherein the predetermined value is 90%.

11. The image scanning apparatus of claim 1, wherein the document feeder scanning portion includes a translucent plate over which the plurality of documents are successively passed, the scanner is under the translucent plate when it scans the plurality of documents passing over the translucent plate, and the test element is located above the translucent plate of the document feeder scanning portion.

12. The image scanning apparatus of claim 1, wherein the determination means makes determination before a first document fed from the document feeder scanning portion is scanned.

13. The image scanning apparatus of claim 1 further including a display for indicating a message or sign to urge lamp exchange if the determination means does not determine that the light source illuminates appropriately.

14. The image scanning apparatus of claim 13 further including means for making a sound to urge lamp exchange if the determination means does not determine that the light source illuminates appropriately.

15. The image scanning apparatus of claim 1 further including a memory for storing image data of the document as obtained by scanning, and wherein the image data is erased from the memory if the determination means does not determine that the light source illuminates appropriately.

16. The image scanning apparatus of claim 1 further including means for making a sound to urge lamp exchange if the determination means does not determine that the light source illuminates appropriately.

* * * * *